United States Patent [19]

Howard

[11] Patent Number: 5,062,938

[45] Date of Patent: Nov. 5, 1991

[54] HIGH COERCIVITY LOW NOISE COBALT ALLOY MAGNETIC RECORDING MEDIUM AND ITS MANUFACTURING PROCESS

[75] Inventor: James K. Howard, Morgan Hill, Calif.

[73] Assignee: International Business Machines Corporation, Armonk, N.Y.

[21] Appl. No.: 464,842

[22] Filed: Jan. 16, 1990

[51] Int. Cl.$^5$ ............................................. G11B 23/00
[52] U.S. Cl. ................................. 204/192.2; 428/678; 428/694; 428/900
[58] Field of Search ............... 428/694, 695, 900, 611, 428/678; 204/192.2

[56] References Cited

U.S. PATENT DOCUMENTS

| | | | |
|---|---|---|---|
| 4,550,062 | 10/1985 | Takayama et al. | 428/678 |
| 4,582,746 | 4/1986 | Shirahata et al. | 428/694 |
| 4,594,296 | 6/1986 | Noguchi et al. | 428/611 |
| 4,661,418 | 4/1987 | Yanai et al. | 428/611 |
| 4,746,559 | 5/1988 | Nishikawa et al. | 428/900 |
| 4,769,282 | 9/1988 | Tada et al. | 428/900 |
| 4,786,564 | 11/1988 | Chen | 428/678 |
| 4,789,598 | 12/1988 | Howard | 428/900 |
| 4,792,497 | 12/1988 | Suzuki et al. | 428/678 |
| 4,939,046 | 7/1990 | Yazawa et al. | 428/678 |

FOREIGN PATENT DOCUMENTS 60-170213  9/1985  Japan.
61-224126  10/1986  Japan.
63-065611  3/1988  Japan.

Primary Examiner—Paul J. Thibodeau
Attorney, Agent, or Firm—Thomas R. Berthold

[57] ABSTRACT

A cobalt alloy disk for horizontal magnetic recording has both high coercivity and low noise at high recording density. The magnetic layer in the disk contains, in addition to the cobalt alloy material, an oxide of one or more "impurity" elements which have both a relatively low solubility in cobalt and a high affinity for oxygen. Such elements include yttrium (Y), silicon (Si), the rare earth elements, hafnium (Hf), germanium (Ge), tin (Sn) and zirconium (Zr). The disk may be formed by co-sputtering the cobalt alloy material and the impurity element(s), and thereafter oxidizing the impurity element(s). The oxidation may occur by heating the disk while the magnetic layer is exposed to oxygen or air, or by exposure of the magnetic layer to an argon-oxygen plasma.

2 Claims, 5 Drawing Sheets

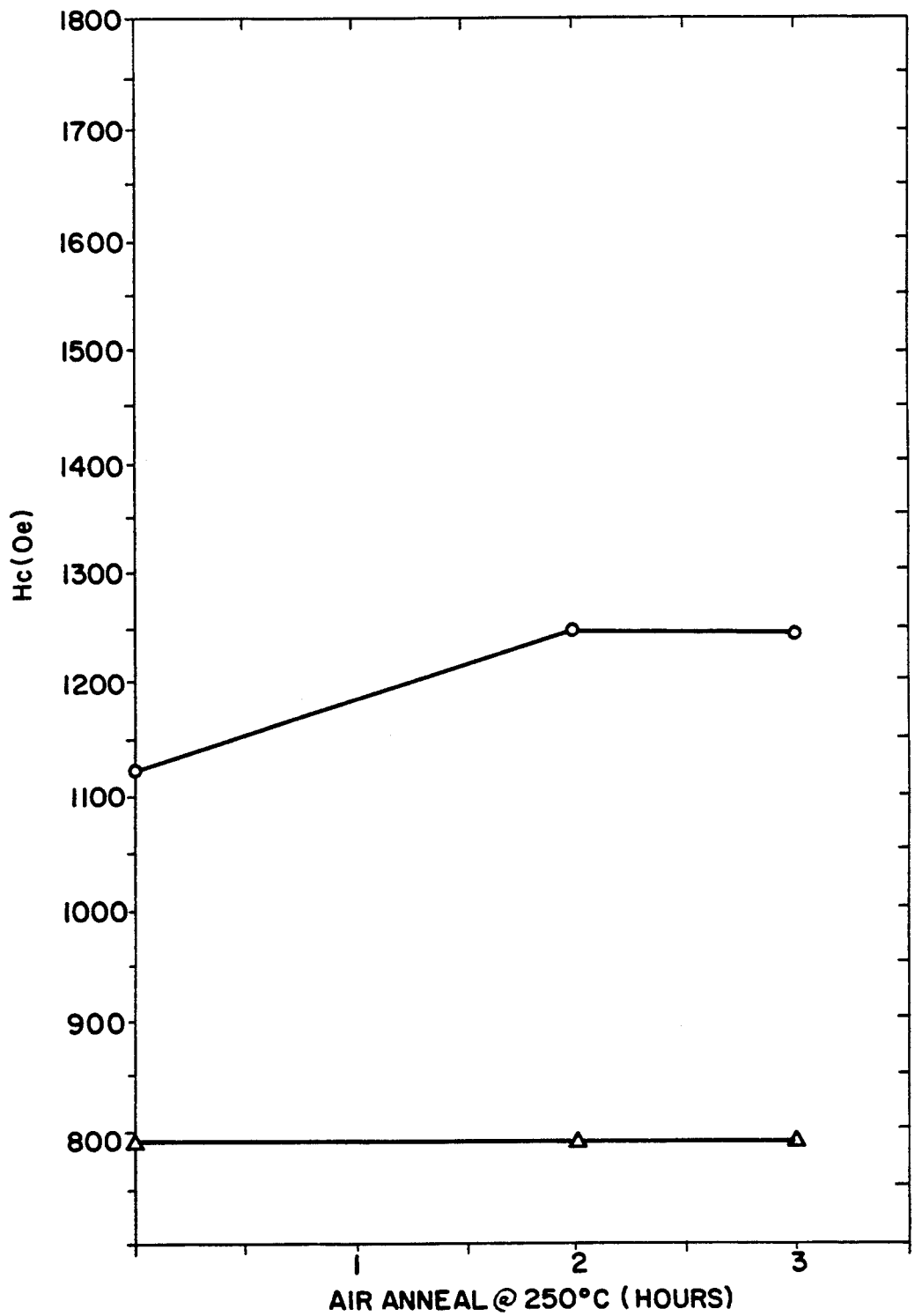

HIGH COERCIVITY LOW NOISE COBALT ALLOY MAGNETIC RECORDING MEDIUM AND ITS MANUFACTURING PROCESS

BACKGROUND OF THE INVENTION

1. Technical Field

This invention relates to thin film metal alloy magnetic recording media for horizontal recording, and in particular to a cobalt alloy disk having high coercivity and low intrinsic media noise, and to a process for making such a disk.

2. Description of the Prior Art

One of the problems with thin film metal alloy magnetic recording media, such as cobalt alloy disks for horizontal recording, is that the intrinsic media noise increases with increasing linear recording density. Media noise arises from irregularities in the magnetic transitions and results in random shifts of the readback signal peaks. These random shifts are referred to as "peak jitter" or "time jitter". Thus, the higher the media noise, the higher the bit error rate. It is therefore desirable to develop a thin film metal alloy media which generates noise below a maximum acceptable level in order that data can be recorded at maximum linear density. The effect of intrinsic media noise, as measured by peak jitter and media signal-to-noise ratio (SNR), on the bit error rate in magnetic recording systems is described by Katz, et al., in "Effect of Bitshift Distribution on Error Rate in Magnetic Recording", *IEEE Trans. on Magnetics*, Vol. MAG-15, pp. 1050–1053, 1979. The measurement of media SNR is described by Belk, et al., in "Measurement of the Intrinsic Signal-to-Noise Ratio for High Performance Rigid Recording Media", *J. Appl. Physics*, 59(2), Jan. 15, 1986, pp. 557–562.

It has been proposed to improve the SNR of thin film cobalt alloy media by incorporating oxygen into the magnetic layer. For example, assignee's copending patent application 07/394,784, filed Aug. 16, 1989 describes a process for forming a low noise cobalt-platinum (CoPt) or cobalt-nickel (CoNi) alloy disk by sputtering the cobalt alloy in the presence of oxygen. Japanese Kokai 61-276116 describes a CoNi alloy disk with high SNR in which the CoNi magnetic layer is sputter deposited on an alumite-coated substrate in the presence of either oxygen or nitrogen, after which the disk is heat treated. While the oxygen doping of cobalt alloy magnetic layers improves the SNR, it also causes a significant reduction in coercivity. Thus it is desirable to be able to achieve both high coercivity and low intrinsic media noise in cobalt alloy media.

SUMMARY OF THE INVENTION

The invention is a cobalt alloy disk for horizontal recording which has both high coercivity and low noise at high recording density. The magnetic layer in the disk contains, in addition to the cobalt alloy material, an oxide of one or more "impurity" elements which have both a high affinity for oxygen and an atomic radius substantially different than cobalt so as to have relatively low solubility in cobalt. Such elements include yttrium (Y), silicon (Si), the rare earth elements, hafnium (Hf), germanium (Ge), tin (Sn) and zirconium (Zr). The disk may be formed by co-sputtering the cobalt alloy material and the impurity element(s), and thereafter oxidizing the impurity element(s). The oxidation may occur by heating the disk while the magnetic layer is exposed to oxygen or air, or by exposure of the magnetic layer to an oxygen or argon-oxygen plasma.

The cobalt alloy disk according to the present invention has both high coercivity and an intrinsic media noise at high linear recording density which is substantially less than that for comparable disks formed without an impurity oxide in the magnetic layer. Because the solubility of the impurity elements in cobalt is low and the grain boundary regions in the magnetic layer are high energy sites, the impurity elements will likely cluster at the grain boundaries. The oxidation of the impurity elements is believed to break the coupling between grain boundaries. Thus it is believed that the increase in coercivity and reduction in noise (as confirmed by a reduction in coercivity squareness) is due to a reduction in intergrain coupling in the magnetic layer.

For a fuller understanding of the nature and advantages of the present invention reference should be made to the following detailed description taken in conjunction with the accompanying drawings.

BRIEF DESCRIPTION OF THE DRAWINGS

FIG. 5 is a plot of coercivity of various CoPt and CoNi alloy disks (with impurity elements added) and with adhesion layers and protective carbon overcoats formed over the magnetic layers, as a function of air annealing time.

DESCRIPTION OF THE PREFERRED EMBODIMENTS

The structure of the disks made according to the present invention consisted essentially of a semiconductor grade single crystal silicon substrate, a sputter deposited underlayer of either chromium-vanadium (CrV) tin (Sn) or tungsten (W), a magnetic layer of either a CoPt or CoNi alloy with an oxide of either Y or Si, and a protective overcoat of sputtered carbon.

The disks were prepared in an RF-DC magnetron sputtering system (Sputtered Films, Inc.). The base pressure was approximately $1.5 \times 10^{-7}$ Torr before deposition and was maintained at approximately 3.25 mTorr of Ar for each deposition. Power to the system was 400 Watts and the Ar flow rate was 30 sccm. All depositions were conducted without substrate heat. The substrates were 1 inch Si wafers and 130 mm diameter Si disks for recording measurements. The surfaces of the Si substrates were RF discharge cleaned and the CrV, Sn or W underlayers were formed to various thicknesses over the Si substrates. The magnetic layers were formed to various thicknesses over the underlayers by co-sputtering either the CoPt or CoNi alloy target with either the Y, Sn or Si impurity element target. The relative percentages, in atomic percent (at. %), of the impurity element in the sputter deposited magnetic layer was controlled by controlling power to the impurity element target. The disks were then annealed in air at various temperatures and for various lengths of time to form an oxide of either the Y, Sn or Si in the magnetic layer. Thereafter a protective overcoat of essentially carbon was sputter deposited over the magnetic layer.

Figure 1:
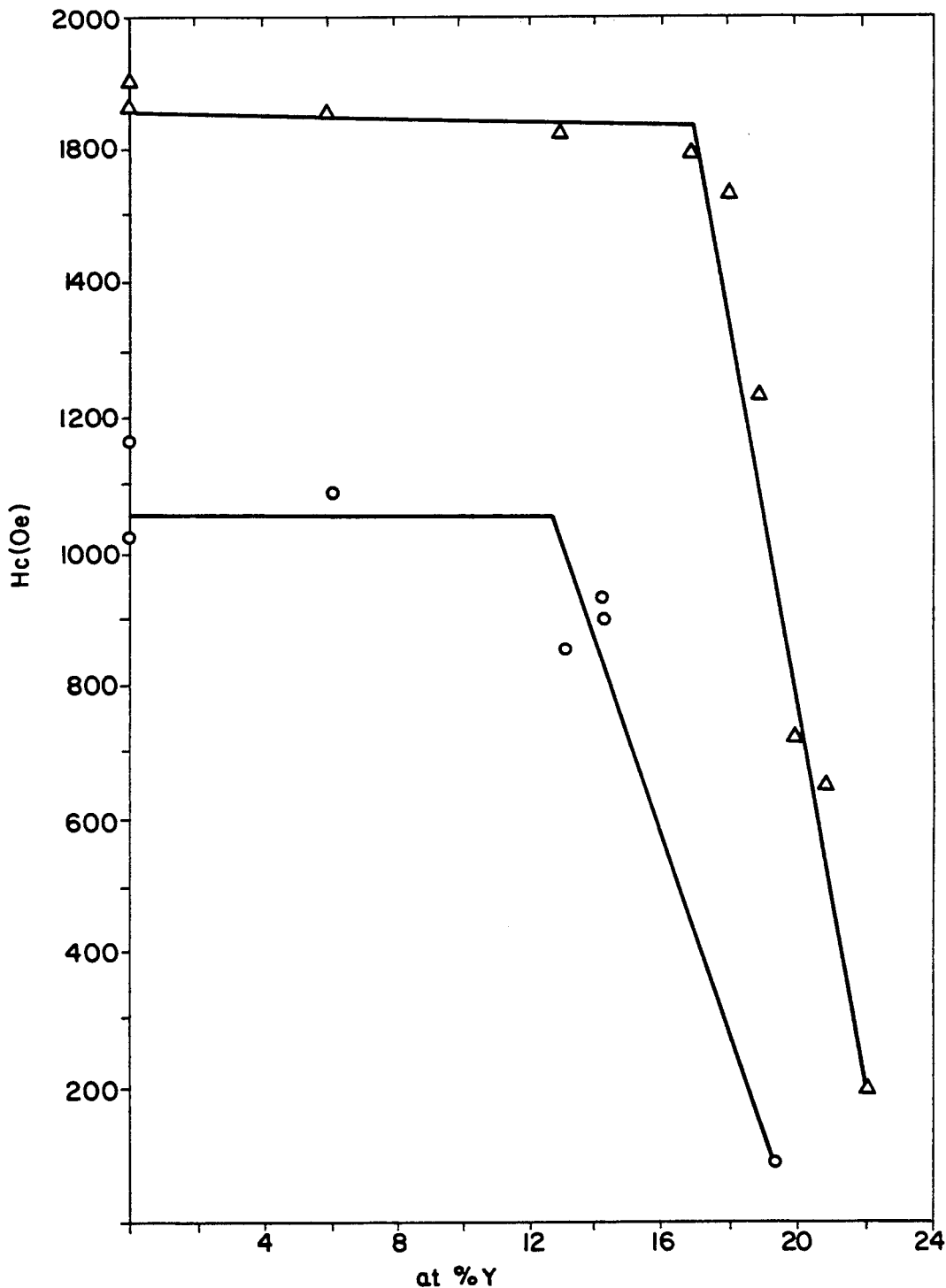
FIG. 1 is a plot of coercivity of CoPt-Y disks as a function of Y additive in the magnetic layer.
Figure 2:
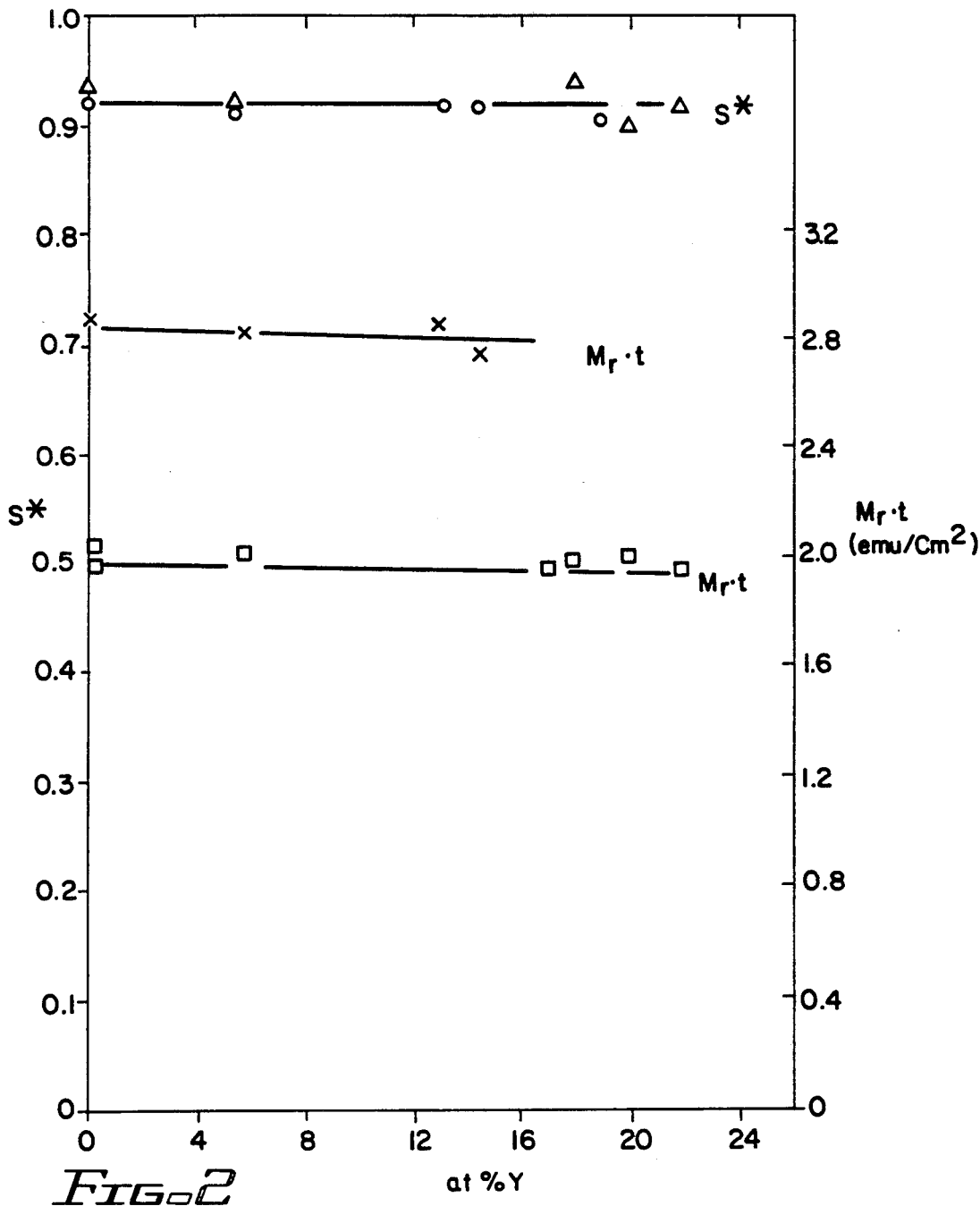
FIG. 2 is a plot of remanence-thickness product and coercivity squareness of CoPt-Y disks as a function of Y additive in the magnetic layer.

FIG. 1 depicts the effect of Y additions on the coercivity of $Co_{90}Pt_{10}$ and $Co_{80}Pt_{20}$ magnetic layers sputter deposited in this manner over CrV underlayers, but without the subsequent oxidation step. Note that coercivity (Hc) is not affected by Y concentrations up to about 12–16 (at. %), but then decreases sharply. The reduction in Hc beyond 16 at. % has been confirmed by x-ray diffraction to be the result of grain size reduction. However, the remanence-thickness product (Mr.t) and coercivity squareness (S*) (see FIG. 2), are not affected by Y, even at relatively high levels of Y.

However, exposure of the surface of a 310 Angstrom thick $(CoPt_{20})_{88}Y_{12}$ magnetic layer to a 200° C. air anneal caused a significant increase in Hc and a decrease in S*. Based on VSM measurement loops of this magnetic layer after a 3-hour anneal, Hc increased from 2,000 to 2,750 Oersteds (Oe) and S* decreased from 0.9 to 0.78. A plot of normalized media noise (isolated pulse amplitude/RMS media noise)$-^1$ at 3000 flux reversals/millimeter (fr/mm) showed a noise figure of merit of about 0.02 for S*=0.78 (after oxidation of the magnetic layer) compared to 0.08 for S*=0.90 (before oxidation of the magnetic layer). For comparison purposes, sputtered gamma $Fe_2O_3$ is a low noise media with S*=0.7–0.78 and a figure of merit of 0.01. A high noise $CO_{80}Pt_{10}$ alloy (S*=0.9–0.95) exhibits a noise figure of merit of 0.09–0.1.

Figure 3:
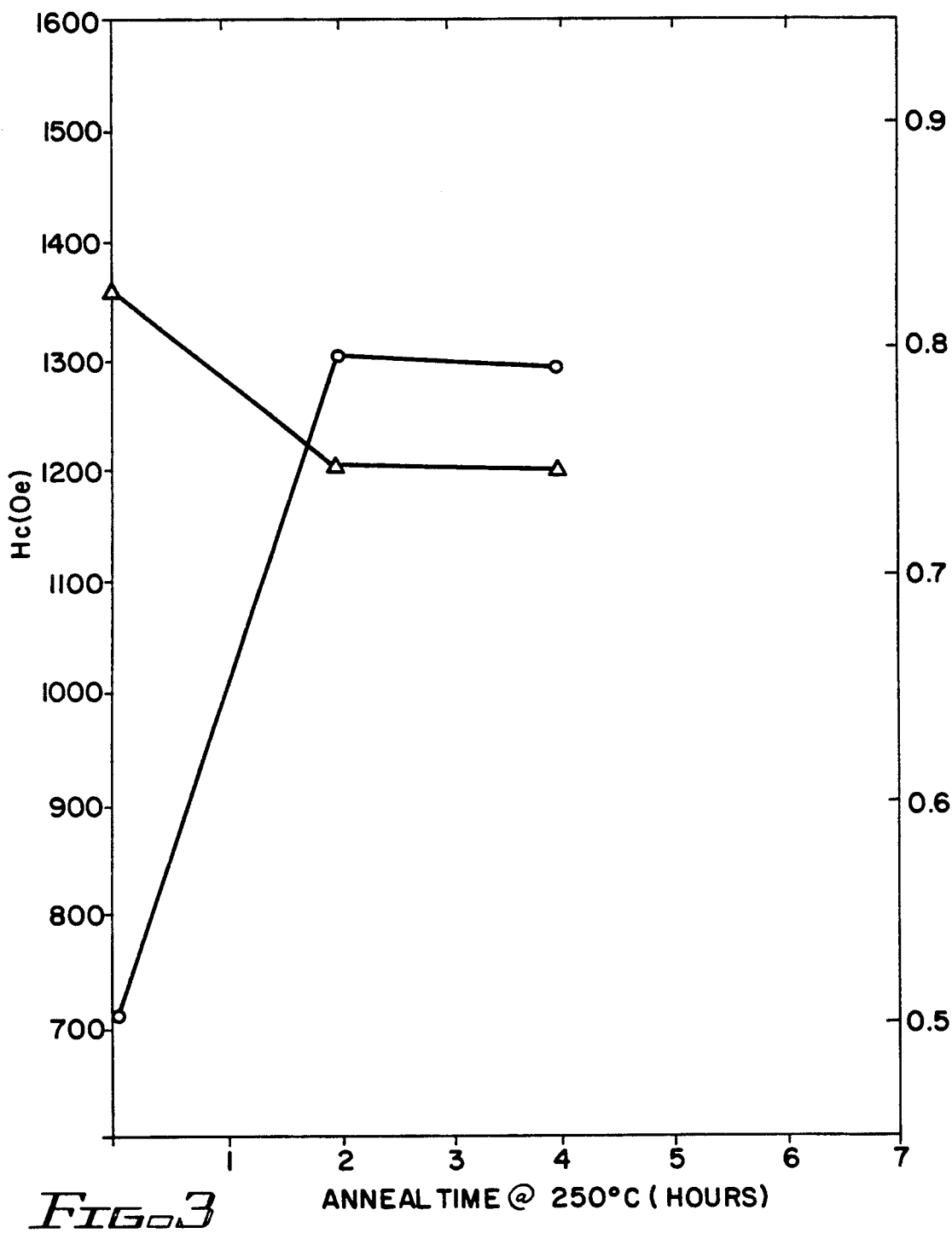
FIG. 3 is a plot of coercivity and coercivity squareness of a CoNiCr-Si disk as a function of air annealing time.

In another example, the effect of oxides of Si on cobalt alloy media was studied. When Si was added to $Co_{74}Pt_9Cr_{17}$, the magnetic properties (Hc, Mr.t, S*) were not affected by Si additions up to about 10 at. %. Since Si addition, without subsequent oxidation, did not affect a CoPtCr magnetic layer, Si was then added to a $Co_{72.5}Ni_{20}Cr_{7.5}$ alloy during sputter deposition. The CoNiCr magnetic layer was formed on a tungsten (W) underlayer. FIG. 3 shows that subsequent air annealing of the $(Co_{72.5}Ni_{20}Cr_{7.5})(Si)$ magnetic layer at 250° C. for approximately 2 hours caused Hc to increase from 700 Oe to nearly 1300 Oe and S* to decrease from 0.825 to 0.74.

Figure 4:
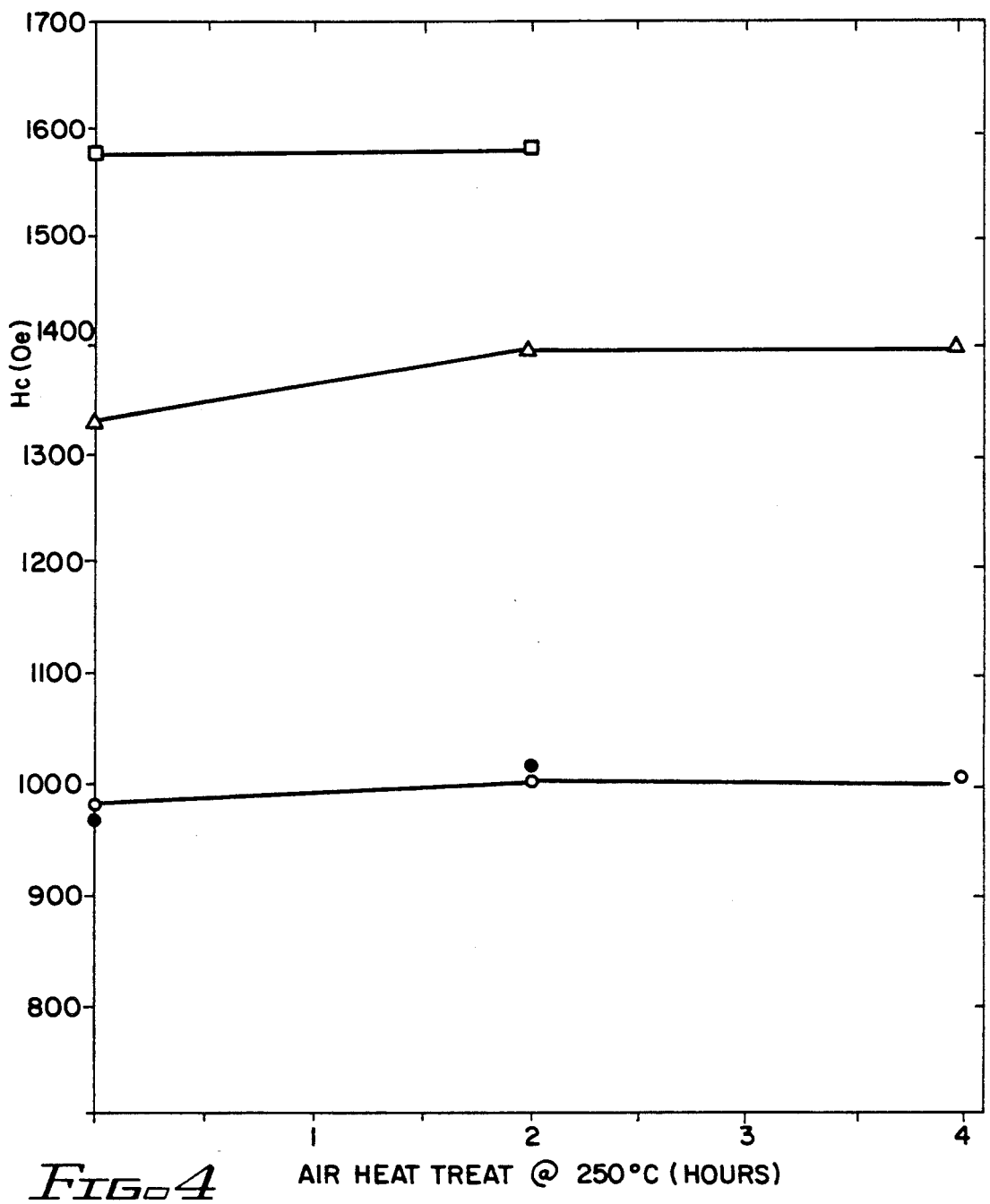
FIG. 4 is a plot of coercivity of various CoPt and CoNi alloy disks (without impurity elements present) as a function of air annealing time.

To demonstrate that the Y and Si impurities added to the CoPt and CoNi alloys were responsible for the increase in Hc and decrease in S* after annealing, disks with CoPtCr and CoNiCr magnetic layers (with and without carbon overcoats) were heat treated for up to four hours at 250° C. in air. FIG. 4 shows that the Hc of these control films was not affected by the air anneal. Thus the annealing effects on the magnetic properties are attributed to preferential oxidation of the impurity Y, Si additives. To indeed verify that the magnetic property changes are a result of oxidation of the reactive component (Y, Si), the CoPtCr-Y and CoNiCr-Si magnetic layers were covered with 50–75 Å thick adhesion layers (CrV, W) and 150–165 Å thick sputtered carbon overcoats prior to the anneal treatment. FIG. 5 shows that Hc increases slightly for CoPtCr-Y (1100 Oe to 1240 Oe) and not at all for CoNiCr-Si. The heat treatment did not change S* for either alloy.

As a result of this experimental data it is believed that it is the oxidation of the Y and Si additives at the grain boundaries in the cobalt alloy which significantly increases Hc and effectively diminishes media noise, as indicated by a reduction in S*. For this reason it should be apparent that the invention is not limited to disks with oxides of only Y or Si, but that comparable results in improved high coercivity, low noise cobalt alloy media can be achieved with oxides of any element having relatively low solubility in cobalt and high oxygen affinity. Examples of such elements include the rare earth elements, as well as Hf, Ge, Sn and Zr. It should also be apparent that other selective methods of oxidation, such as the use of an oxygen or argon-oxygen plasma or the exposure to oxygen rather than air, may be used instead of the air annealing oxidation step described above. Rapid thermal annealing of the disk structure in a reactive environment (air, $O_2$, Ar-$O_2$) also provides an alternate method to oxidize the reactive components in the disk alloy.

The post-deposition oxidation of grain boundaries in cobalt alloys using low solubility reactive impurities (which tend to segregate at boundaries) provides a method to reduce intergranular coupling and reduce transition noise without reducing grain size and coercivity. The grain boundary oxide provides effective magnetostatic decoupling with the result that coercivity values can be significantly increased in cobalt alloys for magnetic recording. Preferential grain boundary oxidation may also improve the corrosion resistance of cobalt alloys. In addition, the increase in Hc (and decrease in S*) for CoNiCr-Si (FIG. 3) suggests that high coercivity (low noise) cobalt alloys may be achieved without the need for Pt.

The above description relates only to the inventive structure which forms a part of the recording media, and not to the conventional well-known portions of the media and the media fabrication processes. For example, in the fabrication of thin film cobalt alloy disks, it is known to provide a protective overcoat, such as a sputtered carbon film, over the magnetic layer.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a process for the fabrication of a thin film disk for horizontal magnetic recording, the disk being of the type having a magnetic layer comprising a cobalt alloy, wherein the magnetic layer is formed by sputter deposition, an improvement comprising the steps of (a) during the sputter deposition of the cobalt alloy elements, sputter depositing an impurity element selected from the group consisting of Y, Si, the rare earth elements, Hf, Ge, Sn and Zr, and (b) thereafter exposing the sputter deposited magnetic layer to oxygen to form an oxide of the impurity element in the magnetic layer.

2. The improved process according to claim 1, wherein the step of exposing the sputter deposited magnetic layer to oxygen comprises heating the disk in the presence of oxygen.

* * * * *